Aug. 16, 1932.  C. J. COBERLY  1,872,408
CUTTING TORCH STRUCTURE
Filed Feb. 4, 1930  5 Sheets-Sheet 1

INVENTOR:
CLARENCE J. COBERLY,
By
ATTORNEY.

Aug. 16, 1932.  C. J. COBERLY  1,872,408
CUTTING TORCH STRUCTURE
Filed Feb. 4, 1930  5 Sheets-Sheet 4

INVENTOR:
CLARENCE J. COBERLY.
By
ATTORNEY.

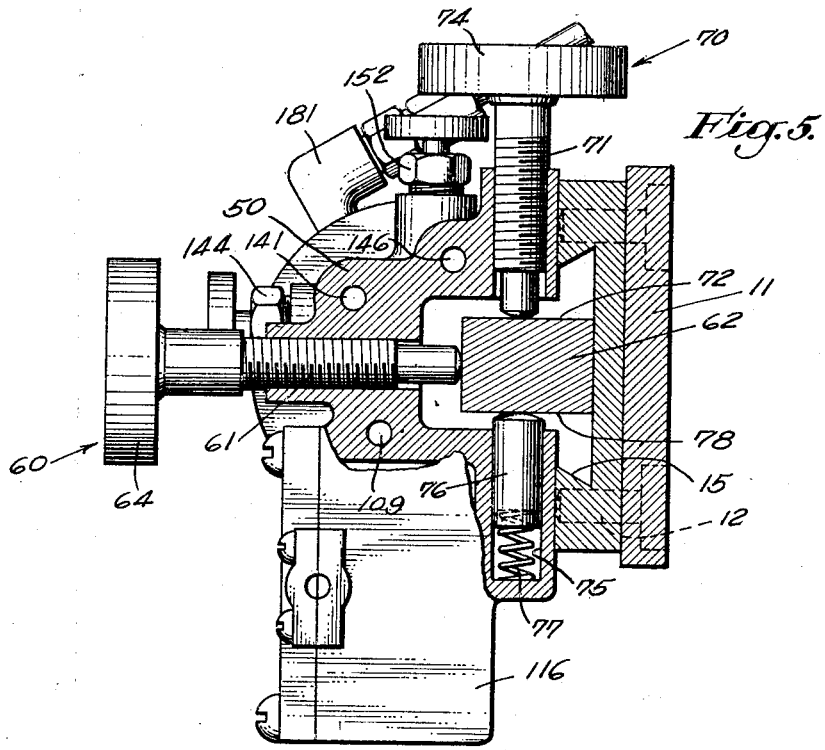
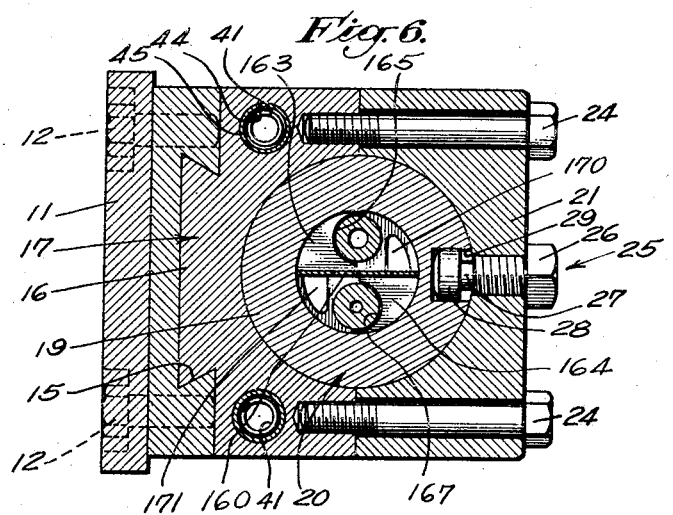

Patented Aug. 16, 1932

1,872,408

UNITED STATES PATENT OFFICE

CLARENCE J. COBERLY, OF LOS ANGELES, CALIFORNIA, ASSIGNOR TO KOBE, INC., OF HUNTINGTON PARK, CALIFORNIA, A CORPORATION OF CALIFORNIA

CUTTING TORCH STRUCTURE

Application filed February 4, 1930. Serial No. 425,839.

My invention relates to a novel cutting torch and to a novel mounting therefor, and finds particular utility in combination with the apparatus shown and described in my co-pending application entitled "Method of and apparatus for cutting slots in pipe", filed Feb. 4, 1930, Serial No. 425,838, wherein one utility of the present torch structure is outlined.

It is often desirable to provide a cutting or welding torch suitably secured to a machine or other support, and to provide adjusting means for easily and accurately adjusting the position of the torch.

It is an object of this invention to provide a novel construction of torch mounting whereby fine adjustments of position of the torch tip relative to the article being cut may be made.

A further object of the invention is to provide a novel torch construction which includes among other features a remotely controlled valve for controlling the cutting action of the torch.

Still a further object of the invention is to provide a novel water-cooled head, as well as to provide a novel positioning means for positioning this head, especially where the head is in the form of a turret having a plurality of cutting tips which may be successively brought into play.

Still another object of the invention is to provide a novel water circulating system wherein this water is carried through the torch body together with the gases which are used in the cutting operation.

Still further objects and advantages of my invention will be evident hereinafter.

Referring to the drawings in which I have illustrated in detail a preferred embodiment of my invention,—

Fig. 5 is a sectional view taken on the line 5—5 of Fig. 3.

Fig. 6 is a sectional view taken on the line 6—6 of Fig. 1.

Figure 3:
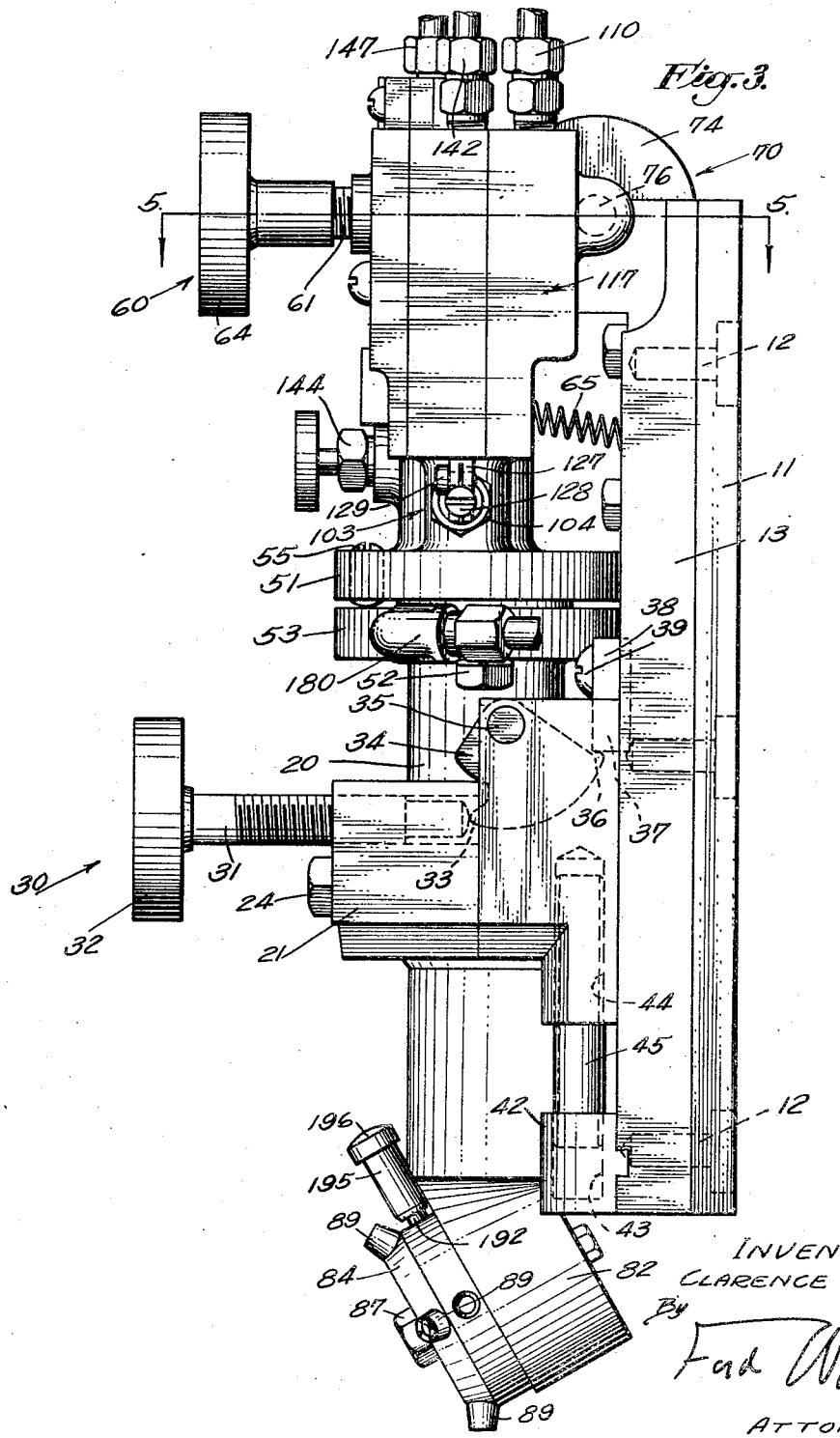
Fig. 3 is a side elevational view of the cutting torch.

Referring particularly to the figures in detail I have illustrated the cutting torch 10 of my invention, this torch providing a base 11 which may be clamped to a suitable support in a well-known manner. Suitably secured to this base, as by bolts 12 indicated in Fig. 3, is a track member 13 providing a way 15 which is of dovetail shape in cross-section and which is adapted to receive a tongue 16 corresponding in shape thereto, this tongue being formed integrally with a block 17, thus permitting this block to slide in a longitudinal direction relative to the base 11.

The block 17 provides a socket 18 in which a ball 19 is adapted to fit, this ball being formed integrally with a body 20 of the cutting torch of my invention. A cap 21 is adapted to hold the ball 19 in the socket 18 and provides a socket 22 in which the ball 19 journals, this cap being suitably secured to the block 17 by cap screws 24, as shown, for instance, in Fig. 6.

Figure 1:
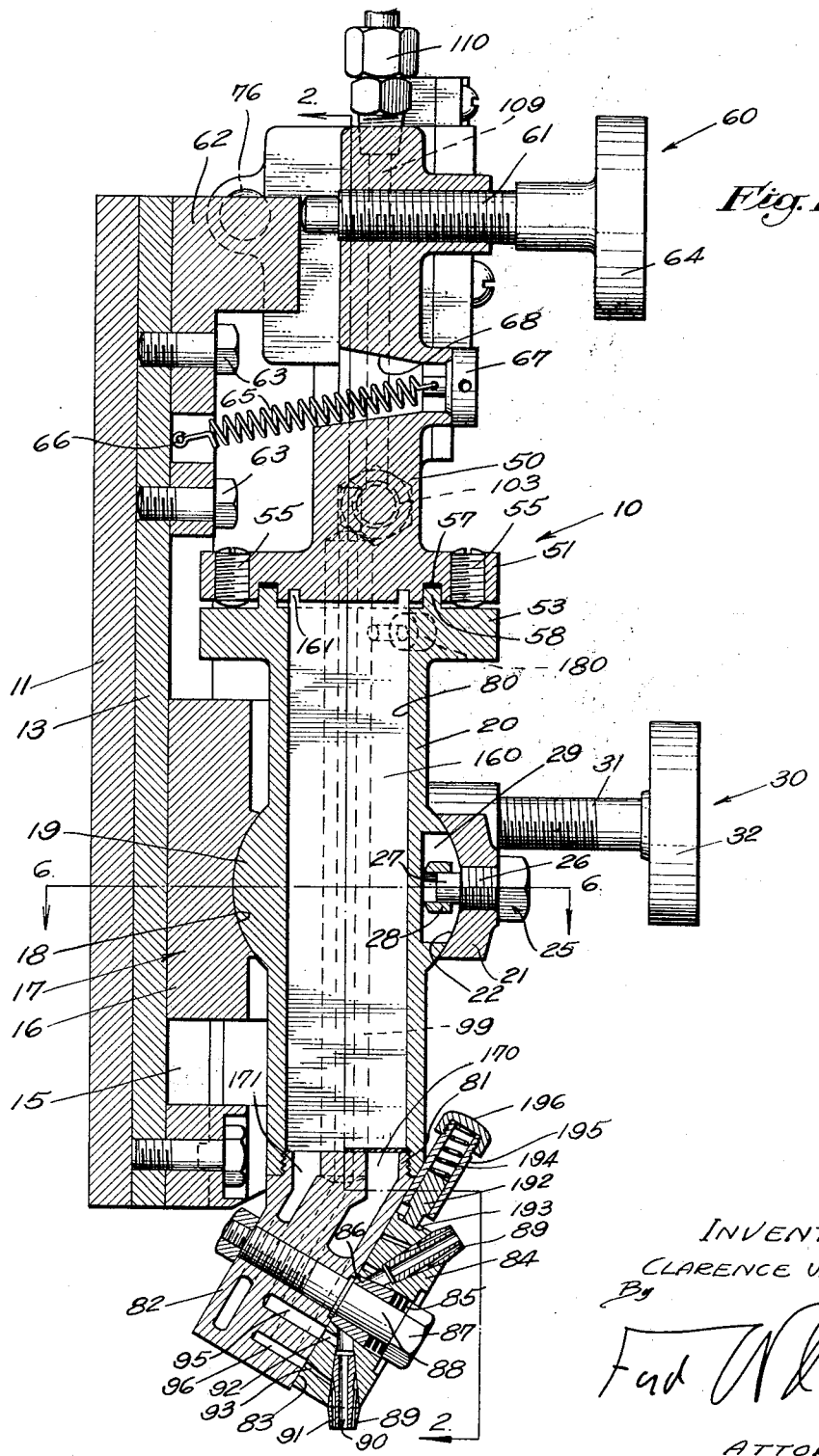
Fig. 1 is a medial sectional view of my cutting torch taken on a primary plane.

A guide means 25 is adapted to prevent any rotation of the body 20 about its longitudinal axis, this being made possible by a bolt 26 having a pin 27 journalling in a collar 28 which snugly engages the side walls of a longitudinal cavity 29 formed in the ball 19. This guiding means does not prevent movement of the body 20 in the plane of Fig. 1, this plane being hereinafter termed the primary plane the position of which is indicated in Fig. 5, nor does it prevent a movement of the body 20 in a secondary plane at right angles to the primary plane and also indicated in Fig. 5, the only function of this guide means being to prevent rotation of the body 20 about its longitudinal axis.

Any movement of the block 17 along the way 15 will, of course, move the body 20 in a longitudinal direction. To facilitate quick and accurate longitudinal movements of the body 20 I provide an advancing means 30, best illustrated in Figs. 2 and 3, and which includes a threaded screw 31 provided with a knurled head 32 and which is threadedly received by the cap 21, the forward end of the screw 31 engaging a tip 33 of a cam 34, the shape of which is best shown in Fig. 3. This cam is pivoted on a pin 35 and provides an ear 36 which is in engagement with a tongue 37 of a pressure block 38, this block being secured to the track member 13 by a screw 39.

Both the cam 34 and the tongue 37 are adapted to extend into a slot 40 formed in the block 17. A rotation of the screw 31 thus pivots the cam 34 about the pin 35 and thus moves the block 17 and body 20 along the way 15, due to the co-action of the ear 36 with the tongue 37 of the pressure block 38. This action takes place against the action of a pair of springs 41 which forms part of the advancing means 30, and which springs are compressed between an end member 42 and the block 17, each of these springs fitting in bores 43 and 44 respectively formed in the end member 42 and the block 17. A protecting sleeve 45 surrounds each spring and also extends into these openings, this sleeve being retained in the bore 44 and being slightly smaller in diameter than the bore 43, so that it may slide therein, these sleeves being foreshortened to permit compression of the springs.

The action of the springs 41 is such as to maintain the engaging relationship between the cam 34 and the pressure block 38, these springs being compressed when the screw 31 is advanced relative to the cap 21. When this screw is withdrawn, the springs 41 move the block 17 and its associated elements toward their previous position.

Positioned above the body 20 is a head 50 providing a flange 51 which is adapted to threadedly receive two bolts 52 which are oppositely disposed and which extend upward through a flange 53 formed on the body 20. Spaced midway between the bolts 52 are set screws 55 which extend downward and which are threaded into corresponding openings of the flange 51 and extend a distance below the lower surface thereof. The relative position of the set screws 55 and bolts 52 thus determines the relative positions of the head 50 and body 20. An annular packing chamber 57 is provided in the flange 51, and an annular tongue 58 formed on the flange 53 extends upward thereinto and compresses a suitable packing medium therein, thus forming a fluid-tight joint between the head 50 and body 20.

It should be understood that the head 50 being secured to the body 20 may be used for pivoting the latter in the socket 18 to accomplish still further adjustments in the position of this body. Thus, I provide a primary adjusting means 60 for moving the body 20 in the primary plane, this adjusting means including a screw 61 threaded through the head 50 and engaging the end of an abutment member 62 secured to the track member 13 as by bolts 63. A knurled head 64 is provided on the screw 61 so that it may be manually turned, the advancing of the screw 61 tending to rotate the body 20 in a clockwise direction, as viewed in Fig. 1, this movement taking place in the primary plane, as previously described.

The corresponding counter-clockwise movement is effected by a spring 65 when the screw 61 is retracted, this spring being tensioned between a pin 66 attached to the abutment member 62 and a cap member 67 bearing against the front surface of the head 50. A tapered opening 68 is formed through the head to provide for the passage of the spring 65.

For the purpose of adjusting the body 20 and its associated elements in the secondary plane, I provide a secondary adjusting means 70 which comprises a screw 71 threaded through the head 50 in a direction at right angles to the axis of the screw 61, the end of the screw 71 engaging a side surface 72 of the abutment member 62. A knurled head 74 is provided on the screw 71. Formed in the head 50 directly opposite from the threaded opening receiving the screw 71 is a bore 75 in which a follower 76 is adapted to slide, there being a spring 77 in the bore 75 and compressed between the end of this bore and the follower 75, this spring forcing the follower into pressural engagement with a side surface 78 of the abutment member 62 opposite the surface 72. The rotation of the screw 71 in a manner to advance this screw relative to the head thus pivots the body 20 in the socket 18 in a counter-clockwise direction, as viewed in Fig. 2, this movement compressing the spring 77, this spring being strong enough to again return the body 20 to its former position when the screw 71 is retracted.

It should be noted that the ends of the screws 61 and 71, and the end of the follower 76 are rounded, and that the abutment member 62 is of sufficient length so that any longitudinal movement of the body 20 which might be effected by the advancing means 30 will not cause the screws 61 and 71 to disengage the abutment member 62, this longitudinal movement being permitted by a sliding action which takes place between the abutment member 62 and the members pressing thereagainst.

Formed longitudinally through the body 20 is an opening 80 into the lower end of which is threaded a ledge 81 of a foot 82, this foot providing a ground surface 83 against which a turret head 84 is resiliently pressed by means of a spring 85 bearing against a tapered sleeve 86 positioned in an opening of corresponding shape in the turret head, this spring also engaging the head 87 of a bolt 88 passing through the tapered sleeve 86 and through the foot 82.

This turret head 84 may be of the type disclosed in my patent entitled "Turret tip for torches", granted August 16, 1927, No. 1,639,328, and provides a plurality of cutting tips 89 disposed around the axis of the bolt 88, each tip providing a central oxygen passage 90 and a plurality of side passages 91 which are adapted to impinge a mixed heating gas against the article to be cut. The turret head provides a plurality of oxygen passages 92, each of which communicates with the passage 90 of one tip, and also provides a like number of passages 93 which communicate with the side passages 91 in a well-known manner.

Figure 2:
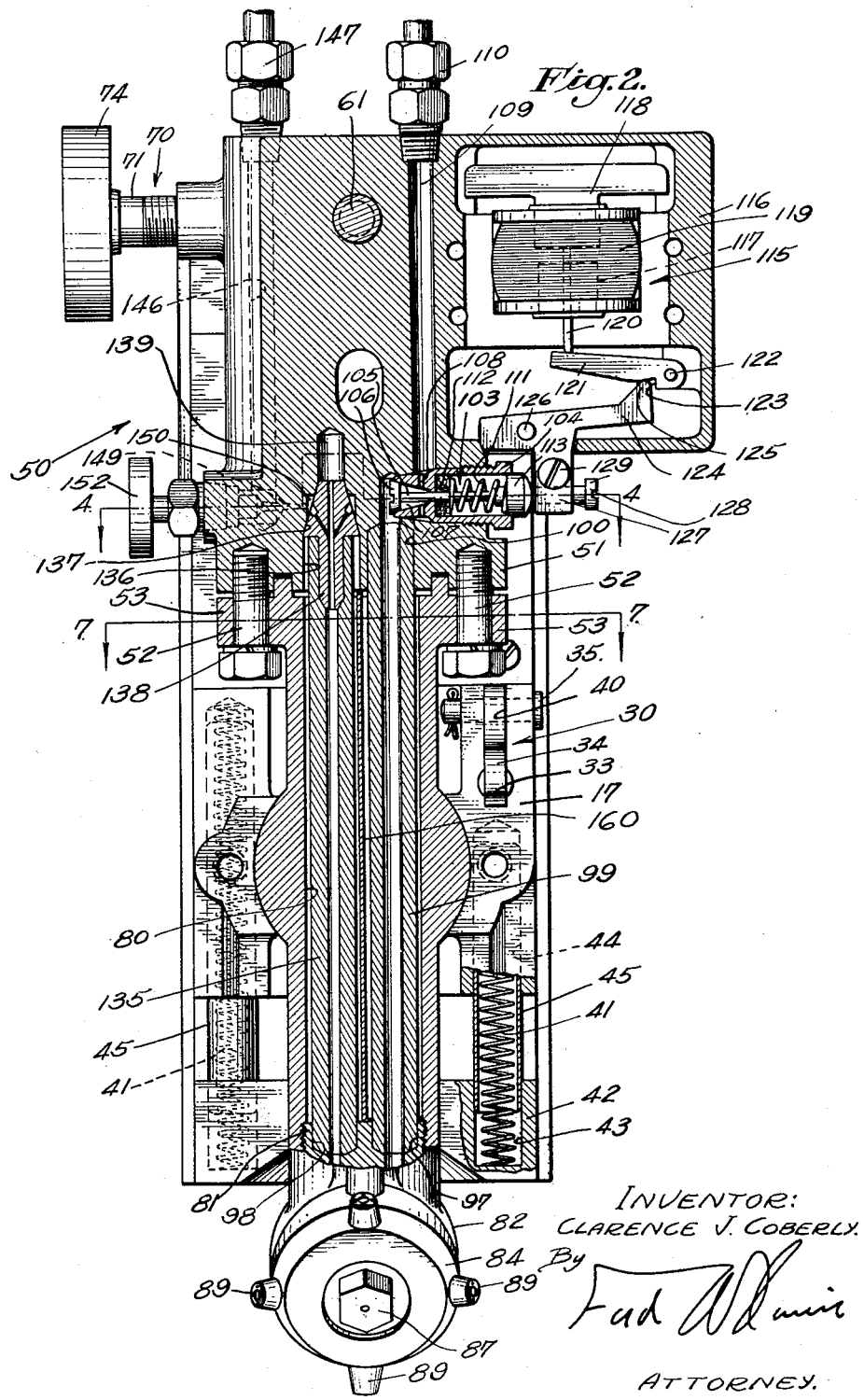
Fig. 2 is a sectional view taken in a secondary plane at right angles to the primary plane.

The particular pair of openings 92 and 93 which are lowermost respectively communicate with an oxygen chamber 95 and a heating gas chamber 96 formed in the foot 82, these chambers respectively communicating with sockets 97 and 98 formed in the upper portion of the ledge 81 and best shown in Fig. 2.

Adapted to engage the lower walls of the socket 97 is an oxygen pipe 99 which extends upward through the opening 80 and into a socket 100 formed in the lower portion of the head 50, the sockets 97 and 100 corresponding in shape to the end of the oxygen pipe 99 so that when the head 50 is secured to the body 20 a fluid-tight joint is obtained at each end of this pipe, the set screws 55 and bolts 52 forming an adjusting means insuring surface contact between the upper end of the oxygen pipe and the top wall of the socket 100 when properly adjusted.

High pressure oxygen is delivered to the interior of the oxygen pipe 99, and thus to the turret head 84, through a magnetically operated valve 103, which may be remotely operated in a manner set forth in my co-pending application supra. The flow control means of this valve provides a body 104 through which a stem 105 extends, this stem carrying a head 106 adapted to seat in a tapered chamber 107 of the body, this chamber being in communication through openings 108 with a passage 109 extending to the top of the head 20 and provided with a suitable gas connection means 110 at this point. A spring 111 is compressed between a packing 112 and a head 113, all three elements being positioned in an enlarged bore of the body 104 in a well-known manner.

Also forming a part of the remotely controlled valve means 103 is a solenoid structure 115 which is enclosed in a housing 116 formed integrally with the head 50. The magnetic circuit of this solenoid structure includes a core 117, which is E-shaped in cross-section, and an armature 118 which is adapted to bridge the core 117 when a winding 119 is energized. The armature 118 carries a pin 120, which engages the free end of a lever 121 pivoted at 122 and which provides a notch 123 relatively close to the pivot 122. A bell crank 124 provides a toe 125 which engages the notch 123, this bell crank being pivoted on a pin 126 and providing an operating arm 127 which includes an adjusting screw 128 and a lock screw 129, the adjusting screw being threaded through the operating arm in a manner to contact the head 113.

Figure 4:
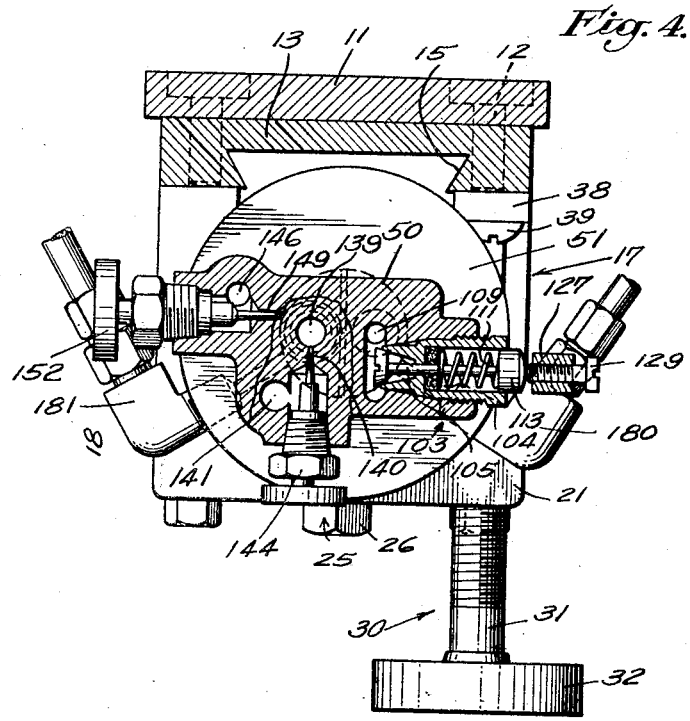
Fig. 4 is a sectional view taken on the line 4—4 of Fig. 2.

Fitting into the socket 98 of the foot 82 is a mixed gas tube 135 which extends upward through the opening 80 and into a chamber 136 formed in the body 50 to correspond to the socket 100. The upper end of this chamber is provided with tapering walls 137 and is adapted to receive a mixing head 138 of conventional design. This head provides a longitudinal passage communicating with a chamber 139 formed above the mixing head 138. This chamber is in communication with a needle valve passage 140, best shown in Fig. 4, and is supplied with acetylene through a passage 141 extending upward through the head and having a suitable gas supply means 142 communicating therewith. A needle valve structure 144 is threadedly received by the head 50, the needle valve of which extends into the opening 140 to control the amount of acetylene reaching the mixing head 138.

A similar passage 146 extends through the head and communicates with a gas supply means 147, which supplies low pressure oxygen thereto, this oxygen passing through a needle valve passage 149 and into an auxiliary chamber 150 formed around the mixing head 138, as best shown in Fig. 2. From hence the low pressure oxygen is communicated through converging openings of the mixing head and into the central passage thereof in a well-known manner. The supply of low pressure oxygen reaching the auxiliary chamber 50 is controlled by a needle valve structure 152 in a well-known manner.

As will be noted from Fig. 2, the upper end of the mixed gas tube 135 abuts against the lower flange of the mixing head 138, and the tube 135 is made of such a length that it compresses the mixing head 138 against the tapered walls 137 when the head 50 is secured to the body 20. When thus clamped, the tube 135 is in fluid-tight relationship with the mixing head 138 and the socket 98, thus preventing any escape of gas therefrom.

Figure 7:
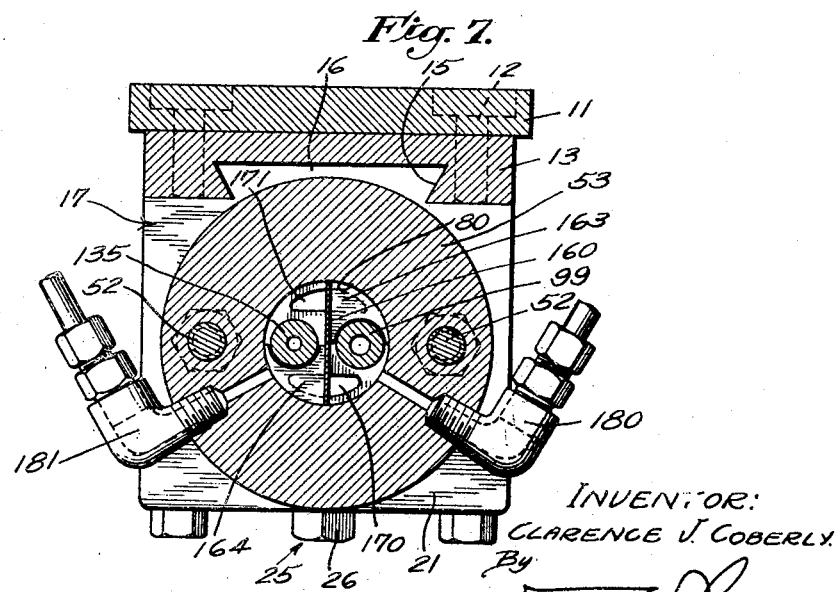
Fig. 7 is a sectional view taken on the line 7—7 of Fig. 2.

Extending through the chamber 80 is a baffle plate 160, the upper end of which has ears 161 extending upward into corresponding openings of the head 50 for the purpose of correctly positioning this baffle relative to the tubes 99 and 135. The lower end of this baffle provides ears 163 and 164 bent outward in opposite directions and which are adapted to lie along the upper surface of the ledge 81, as best shown in Figs. 2, 6 and 7. Each of these ears is bent outward at right angles to the baffle 160, the ear 163 being cut away as indicated by the numeral 165 to allow a passage of the tube 99, while the ear 164 is similarly cut away, as indicated by the numeral 167, to permit the tube 135 to pass thereadjacent.

Suitably cast in the foot 82 are intake and discharge passages 170 and 171 respectively, which are in communication at their lower ends, the passage 170 extending adjacent the ground face 83 so that the cooling medium passing therethrough will absorb the heat to which the turret head is subjected. The intake passage 170 is partially closed by the ear 164, as best shown in Fig. 6, while the discharge passage 171 is partially closed by the ear 163. Thus, any cooling medium which passes downward on one side of the baffle 160 is directed successively through the intake and discharge passages 170 and 171 and returns through the opening 80 on the opposite side of the baffle.

Such a cooling medium is supplied to one side of the baffle 160 through an intake elbow 180 threadedly received in the flange 53 and communicating with the opening 80. The cooling medium is discharged from the opposite side of the baffle 160 through a discharge elbow 181 also threadedly received by the flange 53 and communicating with the opening 80. In this way the cooling medium passes throughout the length of the tubes 99 and 135 and is passed in heat-receiving relationship with the turret head 84.

In the operation of my invention, the particular tip 89 which it is desired to utilize is moved into the lowermost position, being retained in this position by an engaging means in the form of a pin 192 resiliently forced into a cavity 193 by a spring 194, this spring being retained in a retaining shell 195 suitably secured to the foot 82, there being a cap 196 for retaining the spring in place. When thus positioned, the passages of the foot 82 and those connected to the lowest tip are in accurate alignment. The lowermost tip is then accurately positioned relative to the article to be cut, the longitudinal position of this tip being adjusted by the advancing means 30, and the lateral position of this tip is adjusted by moving the primary and secondary adjusting means 60 and 70, it being understood that by simultaneously adjusting these adjusting means any lateral position of the tip may be accurately determined.

The supply of acetylene and low pressure oxygen is then turned on, the mixing head 138 forming a mixed gas which passes downward through the mixed gas tube 135 and is directed through the side passages 91 to the lowermost tip 89 in heating relationship with the article to be cut. The solenoid 119 is then energized, thus moving the lever 121 in anticlockwise direction and moving the bell crank 124 in a clockwise direction, thereby unseating the valve 106 and allowing the high pressure oxygen to pass downward through the oxygen tube 99 and through the central oxygen passage 90 of the lowermost tip 89. When the desired cutting action has been obtained, the solenoid 119 is de-energized and the spring 111 closes the valve means 103. This arrangement is especially desirable where the cutting torch structure is bodily moved during cutting operation, as is disclosed in my co-pending application supra, or where the article to be cut is moved relative to the lowermost tip 89.

While I have found the above construction to be very effective, and the adjusting means shown to be very sensitive as far as fine adjustments are concerned, it should nevertheless be understood that I am not limited solely to this construction, certain of the disclosed features being useful in other capacities than in a cutting torch.

I claim as my invention:

1. In a torch structure, the combination of: a supporting means; a torch; ball and socket means for pivotally connecting said torch and said supporting means; and adjusting means for controlling the pivoting action of said torch relative to said supporting means.

2. In a torch structure, the combination of: a torch, the body of said torch having a ball formed thereon; means forming a socket in which said ball may journal; and adjusting means for adjusting the position of said ball in said socket.

3. In a torch structure, the combination of: a base; a torch, the body of said torch having a ball formed thereon; means forming a socket in said base in which said ball may journal; and a plurality of adjusting means acting between said body and said base for pivoting said torch about the ball-and-socket joint thus formed.

4. In a torch structure, the combination of: a torch, the body of said torch having a ball formed thereon; means forming a socket in which said ball may journal; adjusting means for adjusting the position of said ball in said socket; and means for preventing said torch from rotating in said socket around the longitudinal axis of said torch.

5. In a torch structure, the combination of: a base; a torch; universal pivot means for pivotally connecting said torch to said base; a pair of adjusting members positioned a distance from said pivot means and acting to respectively move said torch in directions at right angles to each other; and spring means for holding said torch against said adjusting members.

6. In a torch structure, the combination of: a supporting means; a torch; ball-and-socket means inter-connecting said torch and said supporting means at a point intermediate the ends of said torch; a tip on one end of said torch; and adjusting means on the opposite end of said ball-and-socket means from said tip and co-operating with said supporting means in adjusting the position of said opposite end of said torch.

7. A combination as defined in claim 6 in which said adjusting means comprises a pair of screws threaded through a portion of said torch and engaging a portion of said supporting means, the axes of said screws being at right angles to each other, and spring means holding said screws in contact with said portion of said supporting means.

8. In a torch structure, the combination of: a body having an opening; a turret head rotatably mounted on said body; a plurality of cutting tips carried by said head; means dividing said opening into intake and discharge passages through which a cooling medium may successively flow, said cooling medium passing in heat-receiving relationship with said tips; and means extending through said opening for conducting gas to said tips.

9. In a torch structure, the combination of: a body having an opening therethrough; a foot member secured to one end of said body and providing intake and discharge passages formed therein; a baffle plate in said opening and dividing said opening into spaces respectively communicating with said passages; means providing gas passages in each of said spaces provided by said baffle plate; and means for supplying cooling medium to one of said spaces and for conducting cooling medium from the other of said spaces.

10. In combination in a torch structure having a foot member and a turret head rotatably mounted thereon, said turret head providing cavities around the periphery thereof: a retaining means mounted in fixed relationship with said foot member; engaging means slidable relative to said retaining means and providing means for successively engaging in said cavities when said turret head is rotated, the direction of movement of said engaging means and the axis of rotation of said turret head intersecting each other at substantially right angles; and spring means acting between said retaining means and said engaging means for resiliently holding said engaging means in said cavities.

11. In a torch structure, the combination of: a supporting base; a torch including a body and head supported on said base; universal pivot means for pivotally connecting said torch body and said base; adjusting means carried by said head for controlling the pivoting action of said torch body relative to said base; and means for advancing said torch body relative to said base.

12. In a torch structure, the combination of: a supporting base; a torch including a body and head supported on said base; universal pivot means for pivotally connecting said torch body and said base; adjusting means adjustable between said head and said base for controlling the pivotal action of said torch body relative to said base; means for advancing said torch body relative to said base; and means for adjusting said torch body relative to said head.

13. In a torch structure, the combination of: a supporting base; a torch including a body supported on said base; means forming a ball on said body; means forming a socket on said base in which said ball may journal; adjusting means for adjusting the position of said ball in said socket; and means for advancing said torch body relative to said base.

14. In a torch structure, the combination of: a supporting base; a torch including a body and head supported on said base; said body of said torch having a ball formed thereon; means forming a socket in which said ball may journal; adjusting means adjustable between said head and said base for adjusting the position of said ball in said socket; means for preventing said torch from rotating in said socket around the longitudinal axis of said torch; and means for advancing said torch relative to said base.

15. In a torch structure, the combination of: a supporting base; a torch including a body and head supported on said base, said body of said torch having a ball formed thereon; means forming a socket in which said ball may journal; adjusting means adjustable between said head and said base for adjusting the position of said ball in said socket; means for preventing said torch from rotating in said socket around the longitudinal axis of said torch; means for advancing said torch relative to said base; and means for adjusting said torch body relative to said head.

16. In a torch structure, the combination of: a supporting base; a torch including a body and head; universal pivot means for pivotally connecting said torch body to said base; a pair of adjusting members operative between said head and said base to respectively move said torch body in directions at right angles to said base; means for advancing said torch relative to said base; and means for adjusting said torch body relative to said head.

17. In a torch structure, the combination of: a supporting base; a torch including a body and a head adjustable on said body; universal pivot means for pivotally connecting said torch body to said base; means operative between said head and said base for moving said torch body in directions at right angles to said base; means operative between said body and said base for advancing said torch relative to said base; and means for pivoting said torch body relative to said head.

18. In a torch structure, the combination of: a supporting base; a torch including a body and head; ball and socket means for pivotally connecting said torch body to said base; and a pair of adjusting members operative between said head and said base to respectively move said torch body in directions at right angles to said base.

19. In a torch structure, the combination of: a body having an opening therethrough; a foot member secured to one end of said body; a turret head rotatably mounted on said foot member; a plurality of cutting tips carried by said turret head; walls forming passages in said foot member and said turret head; baffle means in said opening and dividing said opening into spaces respectively communicating with said passages; and means for supplying cooling medium to one of said spaces and for conducting cooling medium from the other of said spaces.

In testimony whereof, I have hereunto set my hand at Los Angeles, California, this 28th day of January, 1930.

CLARENCE J. COBERLY.